United States Patent [19]

Kono et al.

[11] Patent Number: 4,748,032

[45] Date of Patent: May 31, 1988

[54] METHOD FOR PREVENTING DETERIORATION OF STARCH-CONTAINING FOODS

[75] Inventors: Toshiaki Kono; Takahisa Tokunaga; Goichi Yamaguchi, all of Kanagawa; Hironoshin Kitagawa, Tokyo; Tetsuo Hiraga, Kyoto, all of Japan

[73] Assignee: The Japanese Research and Development Association for Bioreactor System, Tokyo, Japan

[21] Appl. No.: 25,695

[22] Filed: Mar. 13, 1987

[30] Foreign Application Priority Data

Mar. 13, 1986 [JP] Japan ................................. 61-53643

[51] Int. Cl.$^4$ ............................................. A21D 2/08
[52] U.S. Cl. .................................... 426/321; 426/331; 426/549; 426/658; 426/661
[58] Field of Search ............... 426/331, 548, 575, 658, 426/661, 19–21, 61–63, 321

[56] References Cited

U.S. PATENT DOCUMENTS

| 3,031,308 | 4/1962 | Campbell | 426/575 |
| 3,476,571 | 11/1969 | Block et al. | 426/575 |
| 3,962,482 | 6/1976 | Comer et al. | 426/575 |
| 4,292,337 | 9/1981 | Andersen | 426/575 |

*Primary Examiner*—Raymond N. Jones
*Assistant Examiner*—Marianne M. Cintins
*Attorney, Agent, or Firm*—Sughrue, Mion, Zinn, Macpeak & Seas

[57] ABSTRACT

A method for preventing deterioration of a food is disclosed wherein an oligosaccharide originating from agar or carrageenan or both agar and carrageenan are added to the food. The method is effective to prevent deterioration of foods attributed to retrogradation of gelatinized starch.

4 Claims, No Drawings

METHOD FOR PREVENTING DETERIORATION OF STARCH-CONTAINING FOODS

FIELD OF THE INVENTION

This invention relates to a method for preventing deterioration of foods and, more particularly, to a method for preventing deterioration of starch-containing foods by adding a specific oligosaccharide.

BACKGROUND OF THE INVENTION

Starch is the most important calorie source of foods. Staple foods for humans mainly comprise starch and starch-containing foods are widely used, not only as staple foods but also as subsidiary foods or confections. As starch is usually used in the gelatinized form ($\alpha$-starch) made by heating in the presence of water, foods containing starch undergo hardening due to retrogradation of gelatinized starch to $\beta'$-starch. As a result, palatability and texture of starch-containing foods deteriorate with time, resulting in reduction of commercial value. Therefore, it is difficult to preserve starch-containing foods for a long period fo time or to deliver them over a long distance.

Many attempts have been made in order to prevent or retard deterioration of foods due to retrogradation of starch. Known methods proposed for this purpose include addition of monosaccharides or oligosaccharide, e.g., sorbitol, glucose, sucrose, maltose, etc., which also serve as sweeteners; addition of polysaccharides of the same type as starch, e.g., dextrin, -limit dextrin, starch of glutinous rice or partial hydrolysates thereof, etc.; addition of natural gum or water-soluble polysaccharides, e.g., sodium alginate, etc.; addition of fats and oils or derivatives thereof; addition of surface active agents; and the like. These techniques attained their effects to some extent by taking advantage of the characteristics of the respective additive. However, the preventing of deterioration obtained with prior known additives is still insufficient and there has been a demand for a material free from deterioration or an efficient method of preventing deterioration of foods.

SUMMARY OF THE INVENTION

As a result of extensive investigation, it has now been found that specific oligosaccharides obtained by hydrolysis of agar or carrageenan with an acid or an enzyme exhibit powerful effects on prevention of retrogradation of $\alpha$-starch. The present invention has been completed based on this finding.

The present invention relates to a method for preventing deterioration of foods, which comprises adding an oligosaccharide originating from agar or carrageenan or both agar and carrageenan to foods.

DETAILED DESCRIPTION OF THE INVENTION

The oligosaccharides of agar origin which can be used in the present invention can be prepared from agar of any form (e.g., rod, band, plate, string, powder, etc.), agarose (i.e., purified agar), and raw materials of agar, e.g., *Gelidium amansii* Lamouroux, *Gracilaria verrucosa*, etc. The oligosaccharides of carrageenan origin can be obtained from carrageenans or raw materials of carrageenan, i.e., red algae (e.g., *Chondrum ocellatus*).

The oligosaccharides to be used in the invention are suitably prepared by dissolving these materials in water, and by heating and reacting an enzyme to effect enzymatic hydrolysis (cf., e.g., D. Groleu and w. Yaphe, Canadian Journal of Microbiology, 23, 672–679 (1977) and C. Araki, Journal of Chemical Society of Japan, 65, 533 (1944)). Bydrolases for agar include agarase (e.g., $\beta$-agarase originating from *Pseudomonas atlantica*, sold by Sigma Co.), etc., and those for carrageenans include carrageenase (e.g., $\kappa$-carrageenase originated from *Pseudomonas carrageenovora*), etc. The conditions for enzymatic hydrolysis are not particularly limited. Oligosaccharide mixtures having an arbitrary molecular weight distribution can be obtained by appropriately controlling the amount of the enzyme used, the reaction temperature, the reaction time, and the like.

Alternatively, the oligosaccharides to be used may also be prepared by hydrolysis of the above-described materials with an acid (cf., e.g., J. Weigh and W. Yaphe, Canadian Journal of Microbiology, 12, 939–947 (1965)). Acids to be employed include sulfuric acid, hydrochloric acid, oxalic acid, etc. The conditions for acid-hydrolysis are not particularly limited and oligosaccharides having various degrees of decomposition can be obtained by arbitrarily selecting the acid concentration, the reaction temperature, the reaction time, and the like. Substantially the same conditions, e.g., heating at 100° C. for 1 hour in 1 N sulfuric acid, can be used for hydrolyzing agar and carrageenan.

The oligosaccharides of agar origin are composed of an agarobiose unit, a neoagarobiose unit, and a neoagarotetraose unit having the structures shown below. In general, it is known that enzymatic hydrolysis of agar yields oligosaccharides composed of a neoagarobiose unit and that acid hydrolysis of agar yields oligosaccharides composed of an agarobiose unit.

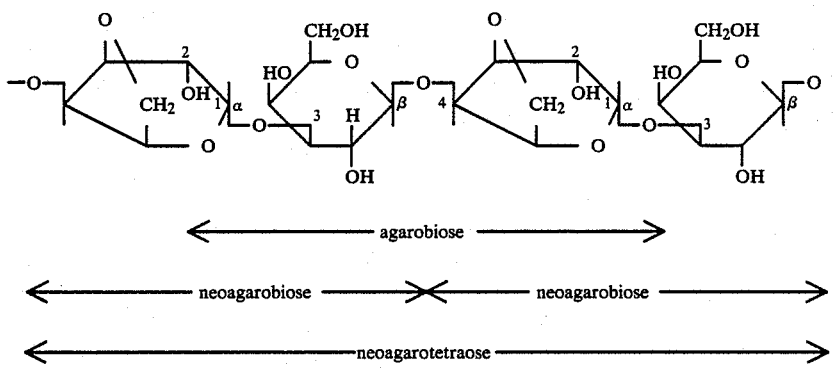

The obligosaccharides of carrageenan origin are composed of a carrabiose unit, a neocarrabiose unit, and a neocarratetraose unit having the structures shown below. In various carrageenans, one or more of the hydroxyl groups at the 2-, 4- and 6-positions are sulfated or, in some cases, the 2- and 4-hydroxyl groups are methylated. In general, it is known that enzymatic hydrolysis of carrageenans produces oligosaccharides composed of a neocarrabiose unit and that acid hydrolysis yields oligosaccharides composed of a carrabiose unit.

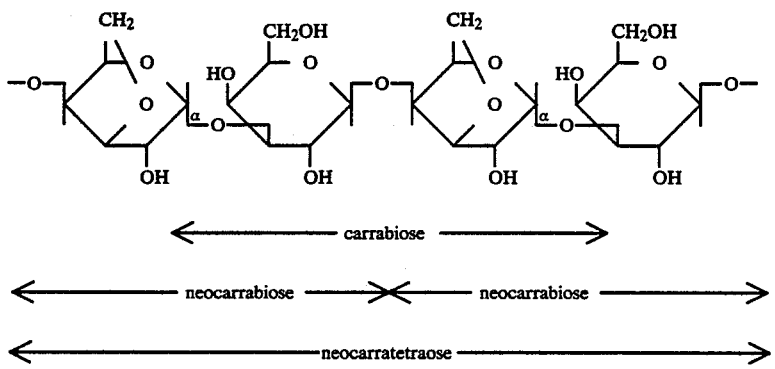

The thus prepared oligosaccharides preferably have a degree of polymerization ranging from 2 to 20. If the degree of polymerization exceeds 20, a sufficient effect to prevent deterioration of foods cannot be obtained.

After the enzyme- or acid-hydrolysis, any insoluble matter is removed from the decomposition mixture, after pH adjustment, if desired, by filtration, centrifugaion, or the like procedure to recover the desired oligosaccharides. If necessary, the resulting oligosaccharides can be purified by decolorization with activated carbon, desalting with ion-exchange resins, fractionation using a membrane or gel filtration chromatographic column, and the like.

The resulting oligosaccharide solution is concentrated to obtain an oligosaccharide syrup (usually 7 to 75 wt %). The oligosaccharide solution may be converted to a powder by spray-drying, freeze drying, vacuum drying, crystallization, or the like procedure.

The thus prepared oligosaccharides either in the form of syrup or in the form of amorphous or crystalline powder are used in the same manner as sugars commonly employed in foods, such as sucrose, glucose, maltose, starch syrups, lactose, sorbitol, maltitol, etc. When they are used in substitution for these sugars, remarkable effects in preventing deterioration of foods can be assured.

The amount of the oligosaccharide to be added can be decided appropriately depending on the kind and properties of the food of interest and usually ranges from 3 to 50% by weight based on the weight of the food.

The oligosaccharides according to the present invention are sufficiently effective when used alone, but the effect can be further enhanced by a combined use of conventional carbohydrates known to prevent starch retrogradation. Examples of the conventionally employed carbohydrates are sorbitol, glucose, sucrose, maltose, starch syrups, lactose, maltitol, dextrin, β-limit dextrin, starch of glutinous rice or decomposition products thereof, natural gum, sodium alginate, etc. Of these, higher molecular weight carbohydrates such as dextrin, β-limit dextrin, starch of glutinous rice, natural gum, sodium alginate, etc. can be used in an amount of preferably 0.1 to 3 wt % based on the weight of the composition and lower molecular weight hydrocarbons such as sorbitol, glucose, sucrose, etc. can be used in an amount of preferably not lower than 5 wt % based on the weight of the composition.

The variety of foods to which the present invention is applicable is not particularly limited, and preferably include starch-containing foods, such as staple foods (e.g., breads, noodles, rice cakes, etc.) and confections (e.g., sponge cakes, rice pastes, etc.).

The present invention will now be illustrated in greater detail by way of examples, but it should be understood that the present invention is not limited thereto. In these examples, all the parts and percents are by weight unless otherwise indicated.

EXAMPLE 1

To 100 parts of refined rice flour were added sucrose and a powder of an oligosaccharide mixture having a degree of polymerization of from 4 to 6 which was obtained by hydrolysis of agarose with agarase originated from *Pseudomonas atlantica* in varying amounts as indicated in Table 1 and an adequate amount of water. The mixture was concentrated by heating over an open fire to a water content of about 30% to prepare a rice paste. The rice paste was put in a petri dish, covered with a polyethylene film, and preserved in a refrigerator (about 5° C.) for accelerated deterioration. The degree of deterioration was determined with time by measuring hardness by a rheometer and X-ray diffractometry. As all the samples had substantially the same incipient hardness, the number of days having elapsed until the rheometrical hardness exceeded a level double the incipient hardness is shown in Table 1 as a deterioration period.

As controls, a rice paste prepared by using sucrose alone as a sugar component (Control 1) and a rise paste prepared by replacing the oligosaccharide with maltose (Control 2) were subjected to the same deterioration test as described above.

TABLE 1

|  | Control No. | | Sample No. | | | | |
|---|---|---|---|---|---|---|---|
|  | 1 | 2 | 1 | 2 | 3 | 4 | 5 |
| Sugar Composition (part): | | | | | | | |
| Sucrose | 100 | 30 | 90 | 70 | 45 | 30 | 0 |
| Oligosaccharide | 0 | 0 | 10 | 30 | 55 | 70 | 100 |
| Maltose | — | 70 | — | — | — | — | — |

TABLE 1-continued

| | Control No. | | Sample No. | | | | |
|---|---|---|---|---|---|---|---|
| | 1 | 2 | 1 | 2 | 3 | 4 | 5 |
| Deterioration Period (day) | 0.5 | 1 | 2 | 7 | 14 | 27 | >60 |

As can be seen from Table 1, the oligosaccharide according to the present invention exerts a marked effect to prevent deterioration of foods even when used in a small proportion.

The results of X-ray diffractometry also proved that addition of the oligosaccharide of the invention is effective to prevent retrogradation of gelatinizede startch.

EXAMPLE 2

A rise paste was made in the same manner as described in Example 1 except for replacing the sugars with 70 parts sucrose and 30 parts oligosaccharide having a varying degree of polymerization as shown in Table 2. The degree of deterioration, determined in the same manner as in Example 1, is shown in Table 2. The oligosaccharide used was prepared by hydrolyzing agarose or agar with an enzyme or an acid so as to have the prescribed degree of polymerization. A rice paste made by replacing the sugar used in Example 1 with 100 parts sucrose was used as a control.

TABLE 2

| | Con- trol | Sample No. | | | | |
|---|---|---|---|---|---|---|
| | | 1 | 2 | 3 | 4 | 5 |
| Degree of Polymerization of Oligosaccharide | — | 2–4 | 4–6 | 4–10 | 10–20 | >20 |
| Deterioration Period (day) | 0.5 | 10 | 7 | 7 | 4 | 1 |

Table 2 clearly demonstrates that a sufficient effect or retrogradation of gelatinized starch can be brought about by those oligosaccharides having a degree of polymerization not greater than 20.

EXAMPLE 3

A rice paste was made in the same manner as in Example 2 except for replacing the oligosaccharide as used in Example 2 with an oligosaccharide shown in Table 3. The degree of deterioration, determined in the same manner as in Example 1, is shown in Table 3. As a control, a rice paste made by using sucrose in place of the oligosaccharide was used.

TABLE 3

| | Control | Sample No. | | |
|---|---|---|---|---|
| | | 1 | 2 | 3 |
| Origin of Oligosaccharide | — | agarose | agar | carrageenan |
| Process of Hydrolysis | — | enzyme | acid | acid |
| Degree of Polymerization of Oligosaccharide | — | 4–6 | 4–10 | 2–10 |
| Deterioration Period (day) | 0.5 | 7 | 7 | 6 |

As is apparent from Table 3, the oligosaccharides of the present invention exhibit a sufficient effect on retrogradation of gelatinized starch irrespective of their origin and the process of hydrolysis.

EXAMPLE 4

A rice paste was made in the same manner as in Example 1 by using 100 parts refined rice flour, 70 parts maltose, 30 parts oligosaccharide of agarose origin having a degree od polymerization of from 4 to 6, and an adequate amount of water. The resulting rice paste exhibited markedly improved preservability as compared with that obtained by using sucrose in place of maltose.

EXAMPLE 5

To 100 parts of wheat flour were added 10 parts of an oligosaccharide (degree of polymerization: 2–10) which was obtained by acid hydrolysis of agar, 2 parts of baker's yeast, and an adequate amount of water to prepare a dough, which as then baked to make a bread. As a control, a bread was made in the same manner except for using sucrose in place of the oligosaccharide. Immediately after baking, both breads has the same palatability. Each of the breads was then separately packaged and preserved at room temperature for 2 days. After two days, the control bread had a hardness greater than the bread of the invention by a factor of 3 or more, was crumbling with poor palatability. On the other hand, the bread according to the present invention still had elasticity without undergoing much change in hardness.

The ability of oligosaccharide addition to prevent retrogradation of gelatinized starch were also revealed by X-ray diffractometry of these breads.

As described above, the addition of oligosaccharides prepared from daily food materials of high safety effectively prevents starch-containing foods from deterioration due to retrogradation of gelatinized starch. The effects obtained by the present invention are superior to those of conventionally employed sugars. In addition, the oligosaccharides according to the present invention exert their effects on a wide variety of foods, thus broadening their application. The present invention, therefore, makes a great contribution to the field of food manufacture.

While the invention has been described in detail and with reference to specific embodiments thereof, it will be apparent to one skilled in the art that various changes and modifications can be made therein without departing from the spirit and scope thereof.

We claim:

1. A method for preventing deterioration of a starch-containing food due to retrogradation of the starch, comprising adding to the starch-containing food an anit-food deterioration effective amount of an oligosaccharide obtained from hydrolysis of agar, carrageenan or combinations thereof, wherein said oligosaccharide obtained from hydrolysis of agar is an oligo saccharide which consists of units of agarobiose, neoagarobiose and neoagarotetraose and wherein said oligosaccharide obtained from hydrolysis of carrageenan is an oligosaccharide which consists of units of carrabiose, neocarrabiose and neocarratetraose.

2. A method as in claim 1, wherein said oligosaccharide has a degree of polymerization of from 2 to 20.

3. A method as in claim 1, wherein said oligosaccharide is added in an amount of from 3 to 50% by weight based on the weight of the starch-containing food.

4. A method as in claim 1, wherein in the oligosaccharide obtained from hydrolysis of carrageenan, one or more of the hydroxyl groups at the 2-, 4-, and 6- positions are sulfated or one or more of the hydroxyl groups at the 2- and 4- positions are methylated.

* * * * *